Figure 4:
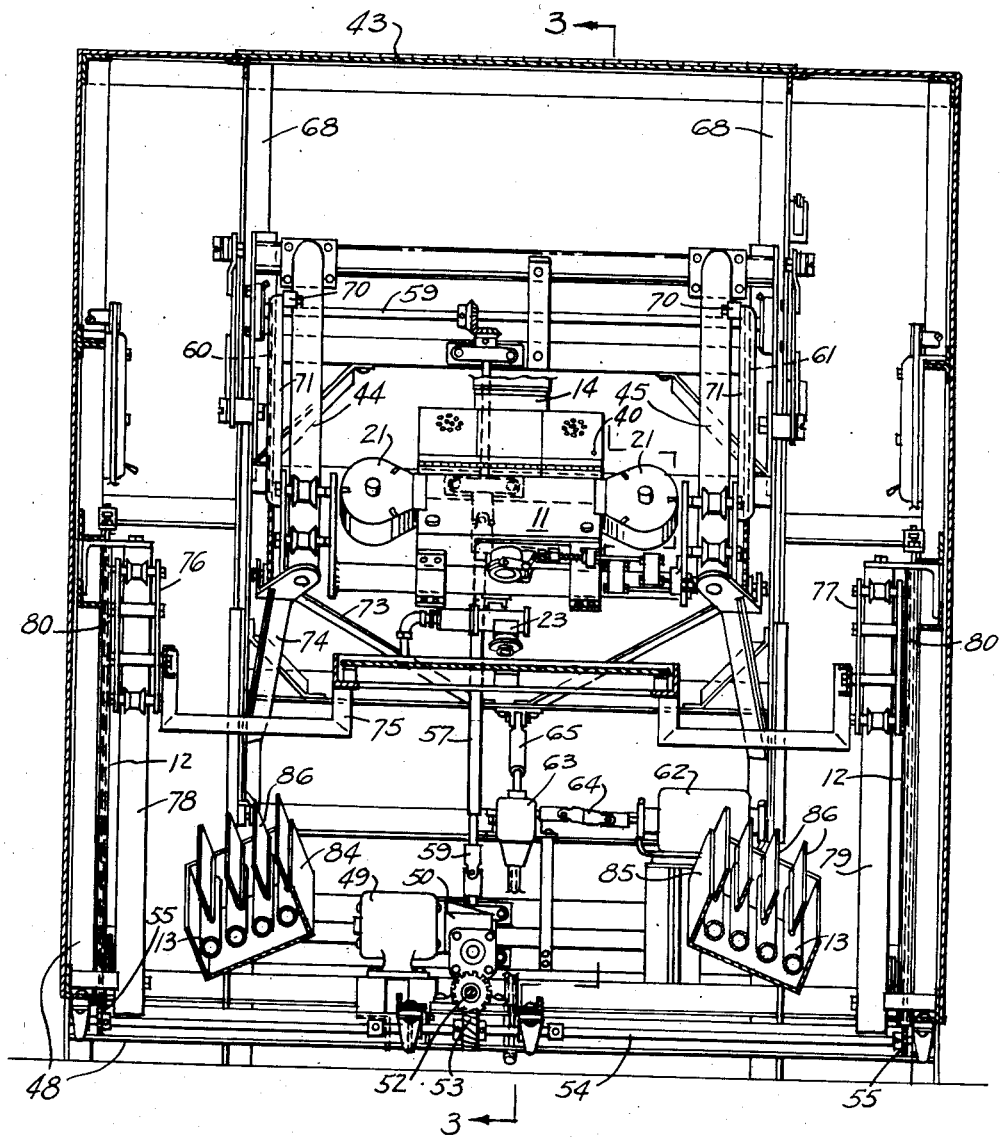

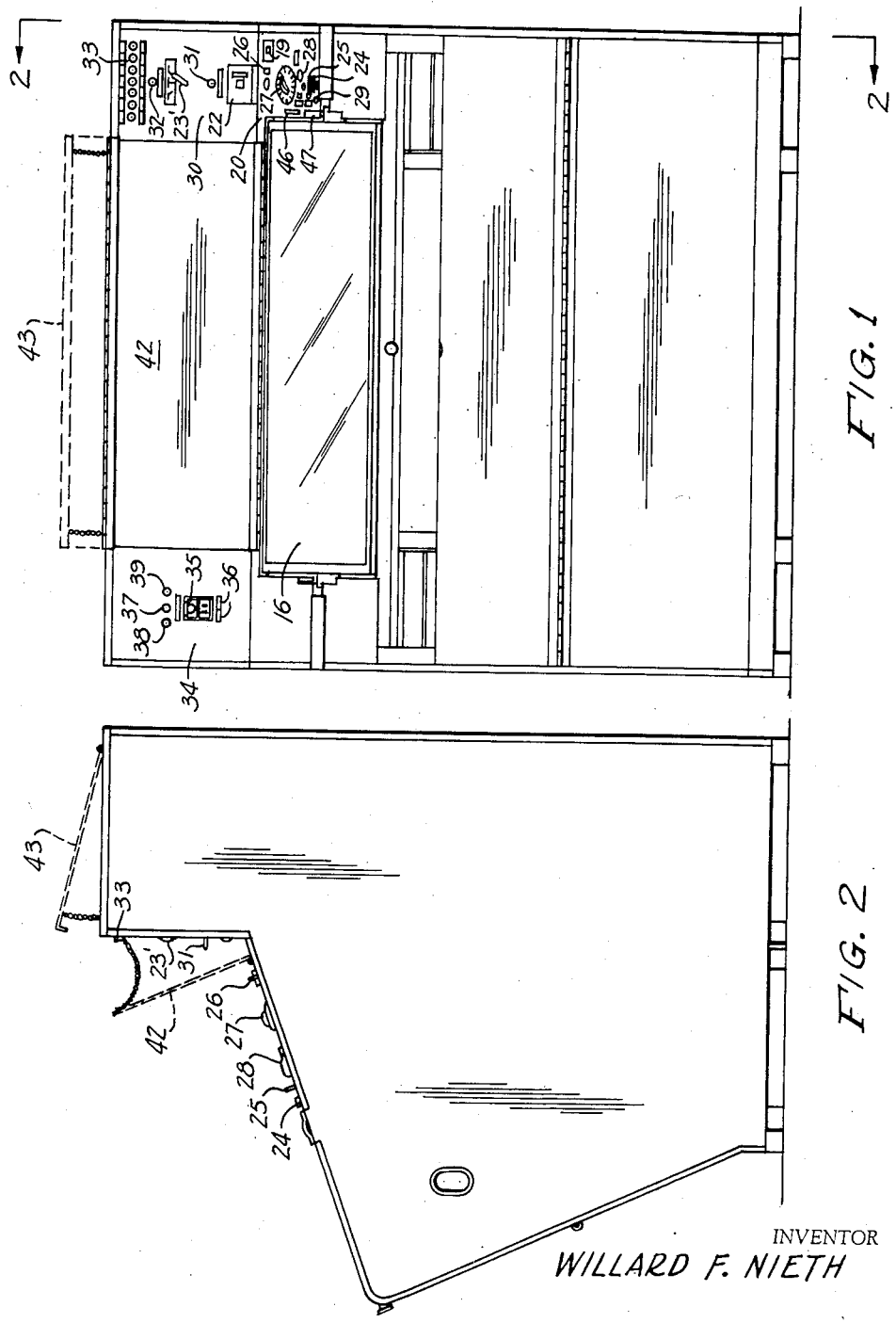

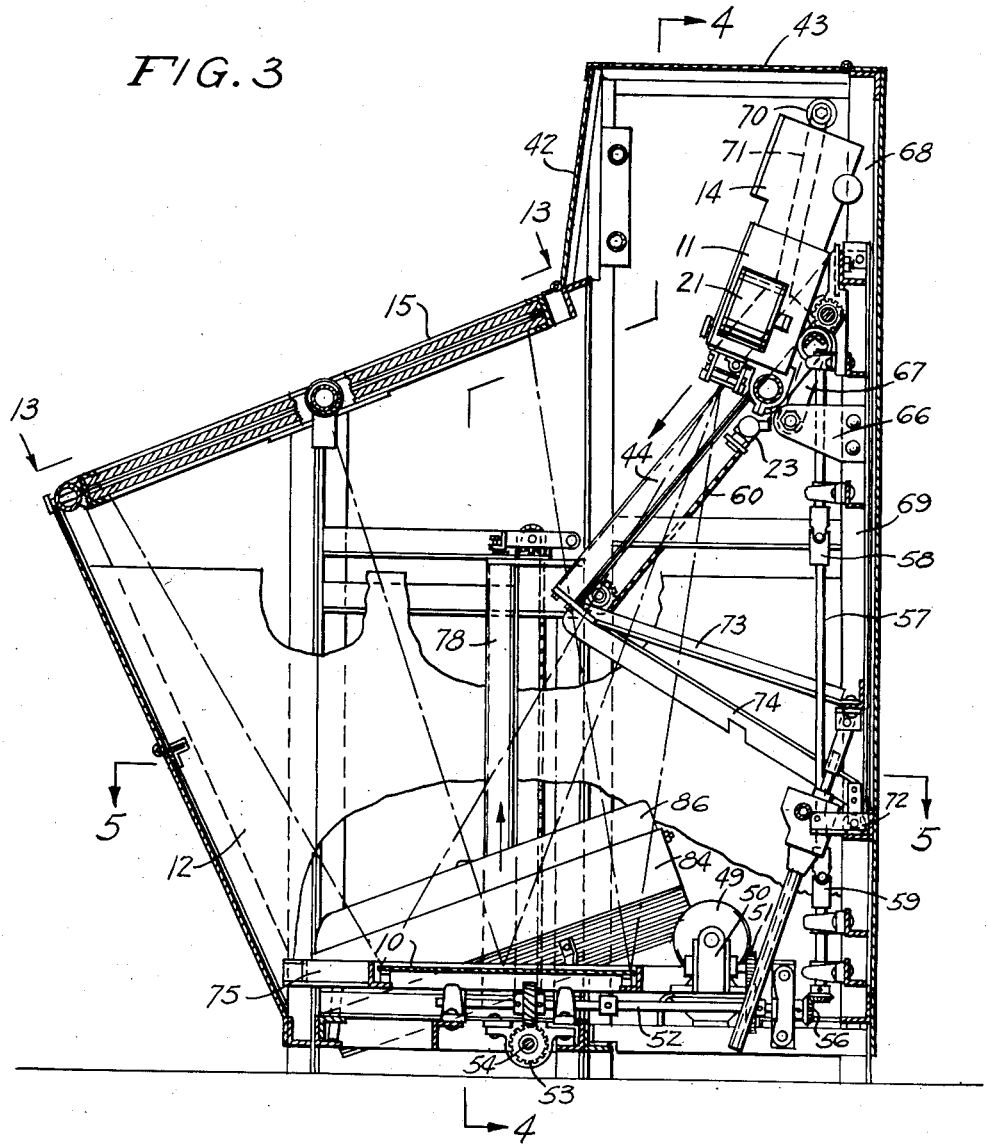

INVENTOR
WILLARD F. NIETH
BY Walter S. Paul
ATTORNEY

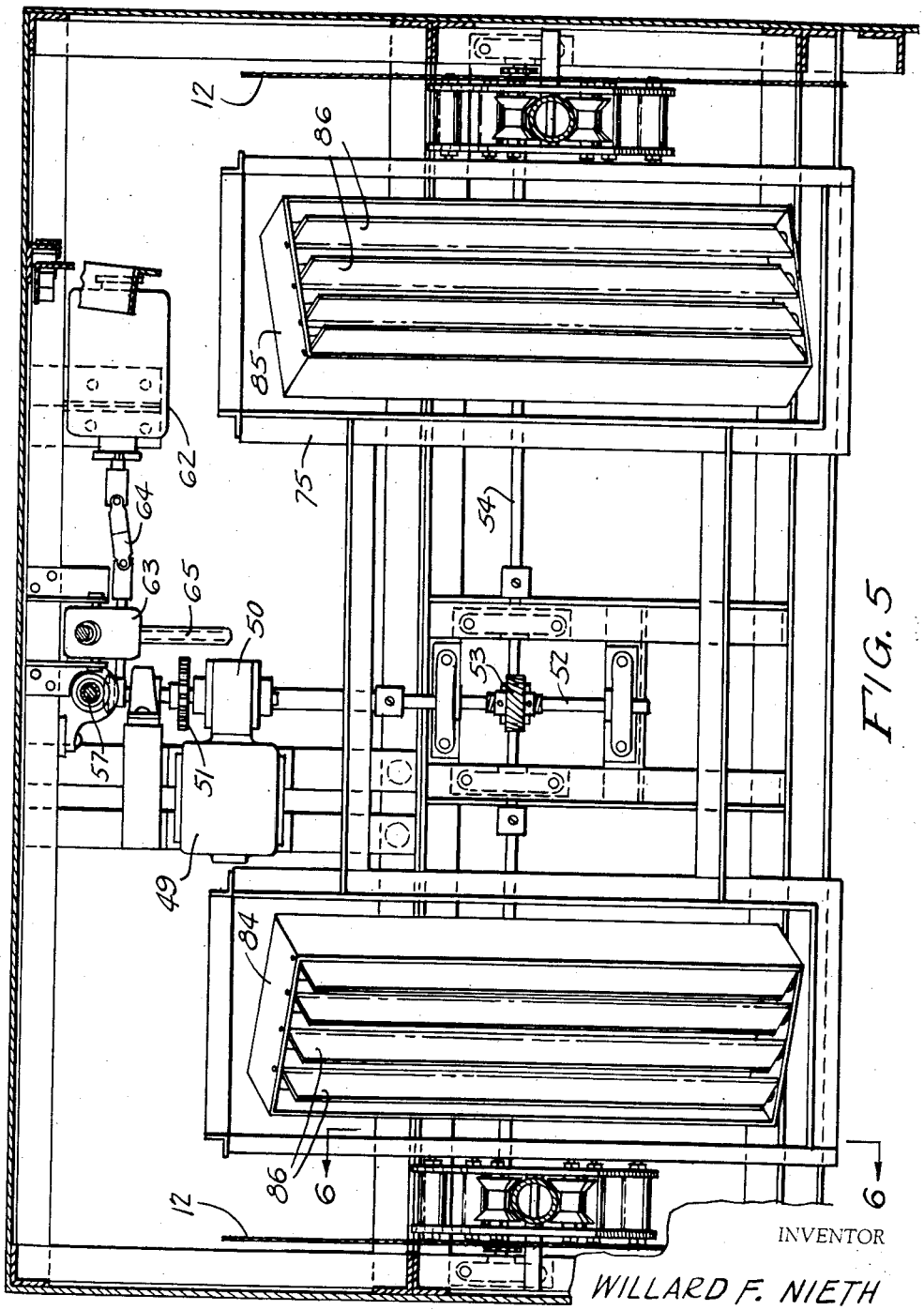

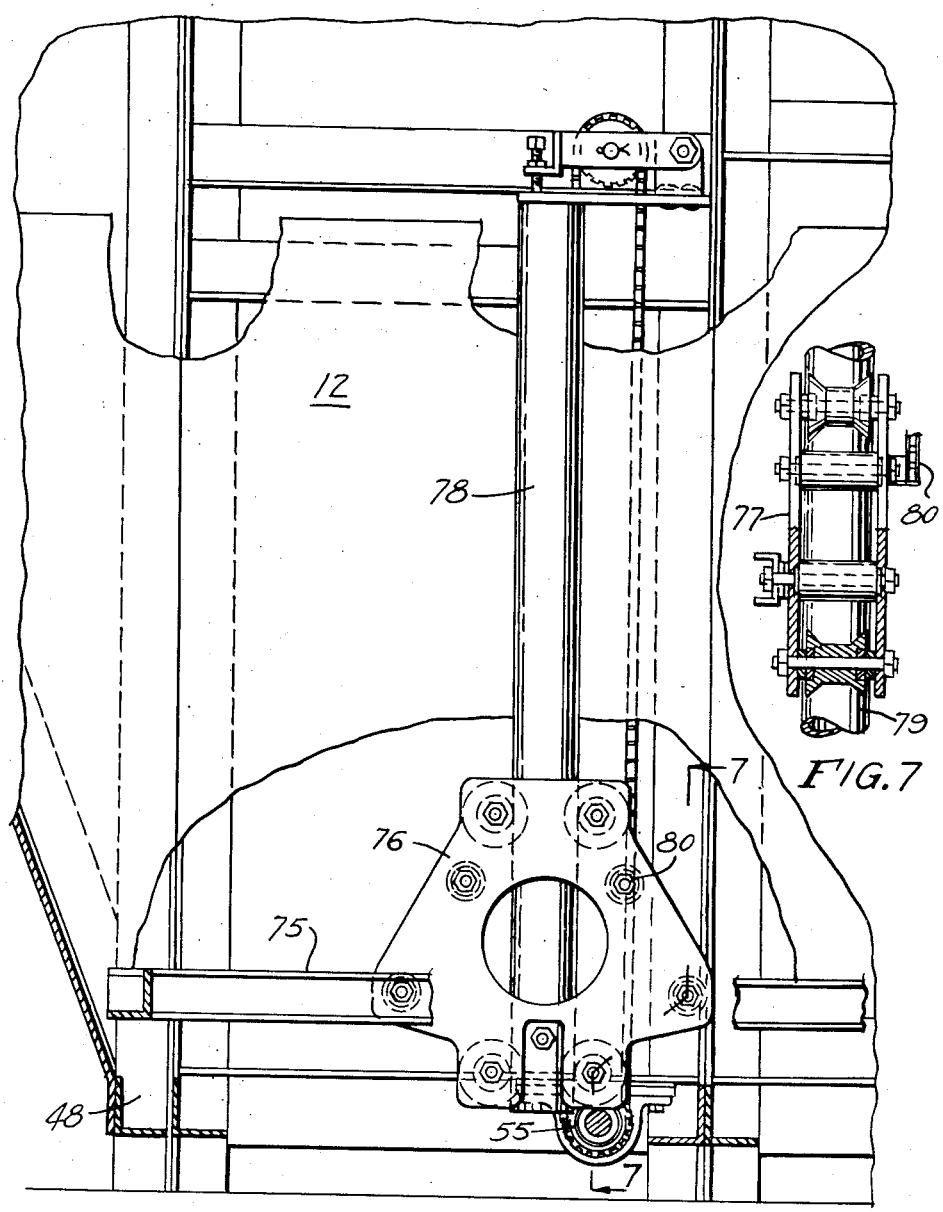

March 25, 1958 W. F. NIETH 2,827,833
CAMERA-PROJECTOR-ENLARGER
Filed March 19, 1956 9 Sheets-Sheet 6

INVENTOR
WILLARD F. NIETH
BY Walter S. Paul.
ATTORNEY

March 25, 1958 W. F. NIETH 2,827,833
CAMERA-PROJECTOR-ENLARGER
Filed March 19, 1956 9 Sheets-Sheet 7
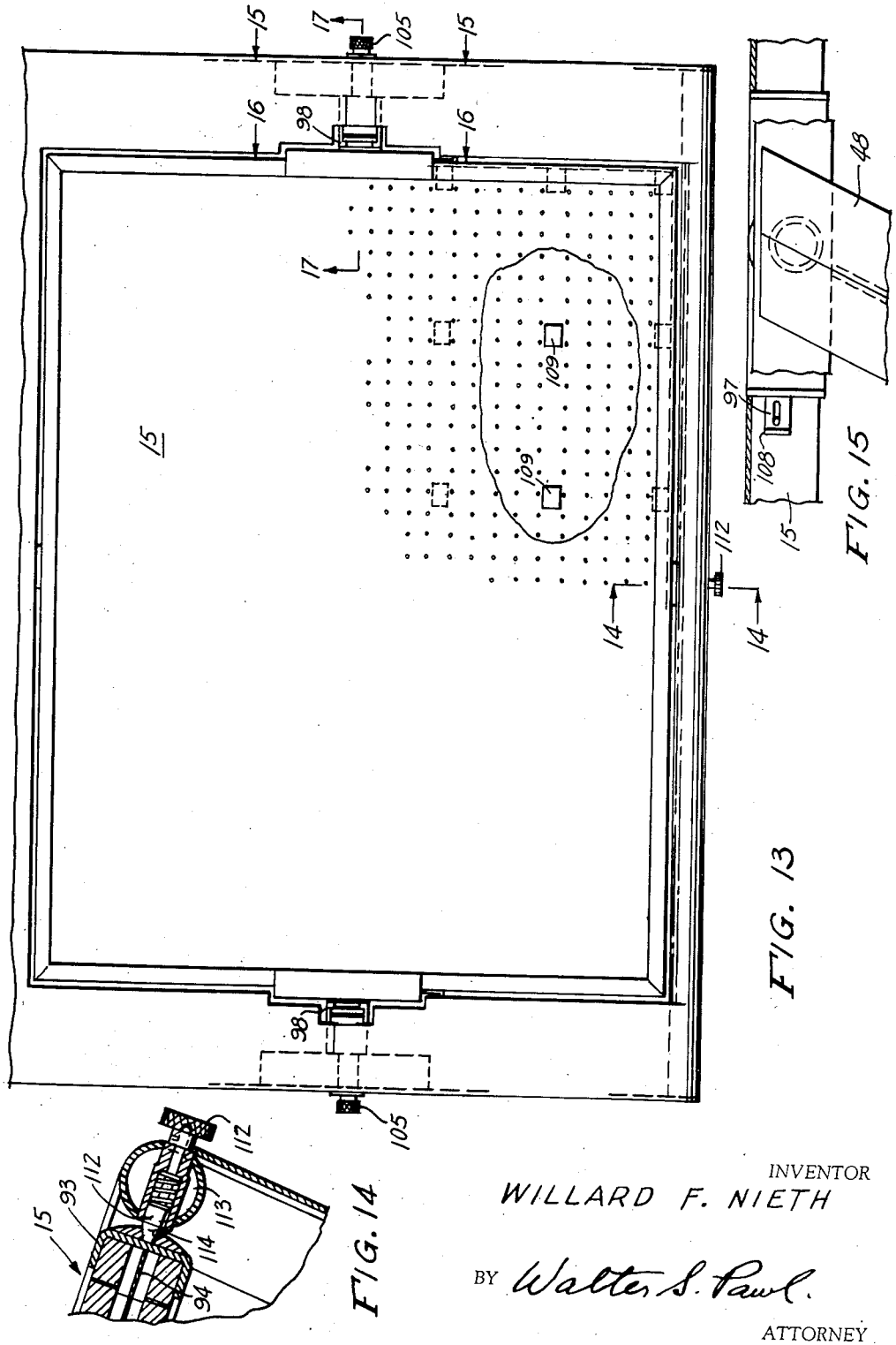
INVENTOR
WILLARD F. NIETH
BY Walter S. Paul
ATTORNEY March 25, 1958     W. F. NIETH     2,827,833
CAMERA-PROJECTOR-ENLARGER
Filed March 19, 1956     9 Sheets-Sheet 9
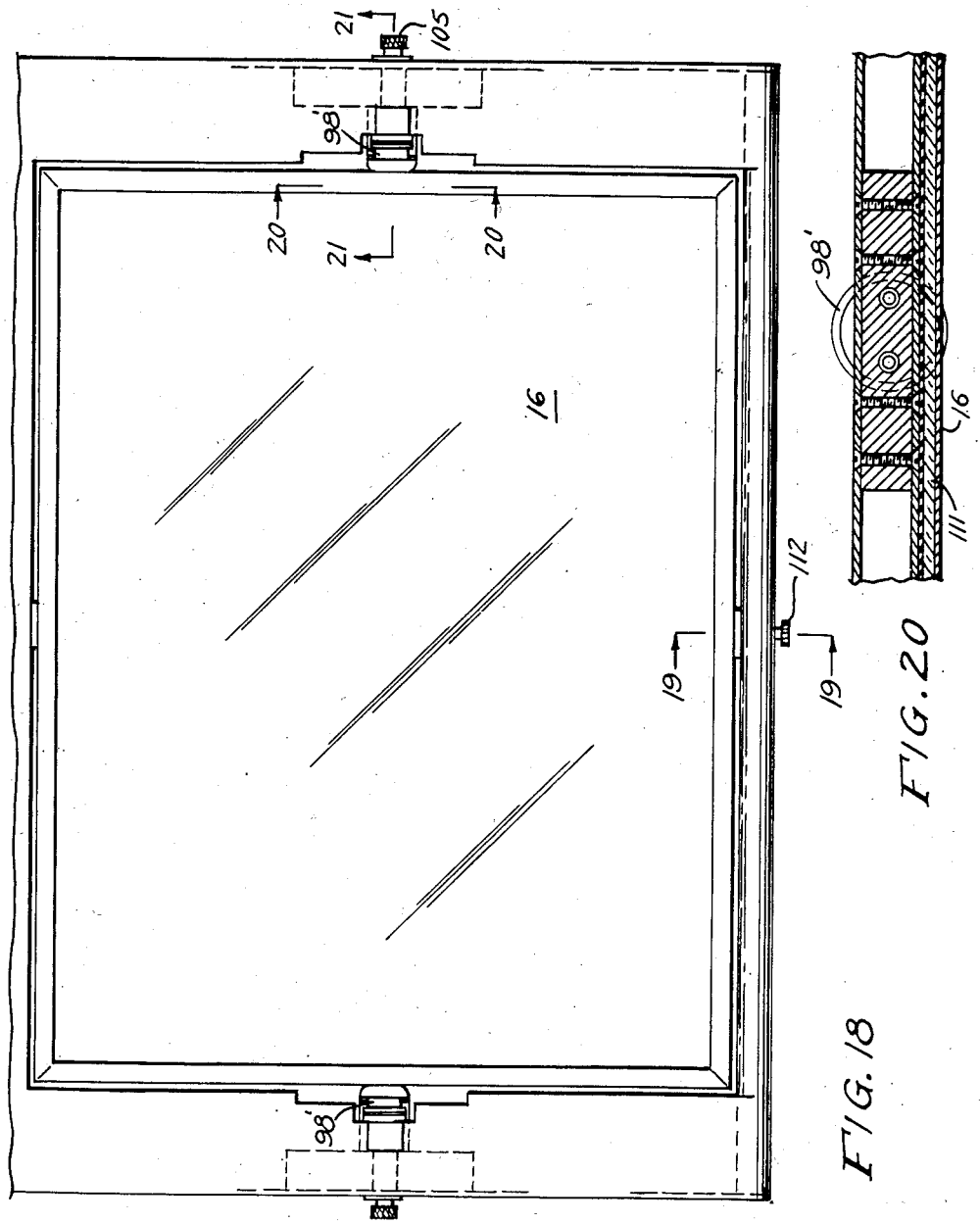
INVENTOR
WILLARD F. NIETH
BY Walter S. Pawl.
ATTORNEY

United States Patent Office 2,827,833
Patented Mar. 25, 1958

2,827,833

CAMERA-PROJECTOR-ENLARGER

Willard F. Nieth, Alexandria, Va., assignor to Photogrammetry, Inc., Silver Spring, Md., a corporation of Delaware Application March 19, 1956, Serial No. 572,507

20 Claims. (Cl. 88—24)

The present invention relates to multi-purpose devices incorporating a camera, and adapted for copying on a reduced scale, projecting on an enlarged scale and reproducing copy on an enlarged scale.

The object is to provide a device of the above type which is compact, simple and adjustable for a wide range of scale reductions and enlargements.

A further object is to devise a novel folded beam system for compactness and comfortable operation from one position for any one of the three purposes enumerated.

A further object is to provide a compound adjustment of the beam reflecting means and the lens and film assembly as well as its auto-focusing means so as to maintain proper angular relations between the copy board, the reflector and the lens and film assembly without using any angular or pivotal adjustments of these parts.

A further object is to provide simultaneous straight-line adjustments for the beam reflector and the lens and film assembly while maintaining the copy board or interchangeable projection screen stationary, the adjustment of the reflector being substantially normal to its reflecting surface, and the adjustment of the lens and film assembly being at an angle to the line of adjustment of the reflector greater than that of the lens axis, so that a maximum range of scale reduction or enlargement may be obtained without any portion of the beam moving off the reflector surface or the board surface which are designed just large enough for the maximum scale.

A further object is to provide ample diffused lighting for the copy board inside the enclosure of the above device.

A further object is to provide condensing lens system for the projection and viewing purposes.

A further object is to adapt the lens and film assembly for use of more than one size of film, to increase the range of scale reduction or enlargement and to accommodate different standard sizes of film.

A further object is to completely light-seal the device for use in enlarging, and provide a visual indicator on the outside, connected to the adjusting mechanism, to show the scale of enlargement to which the mechanism is adjusted.

A further object is to provide automatic controls for changing the scale of enlargement or reduction and the lens focusing means in accordance with the linear movements of the mirror and the lens and film assembly.

Another object is to provide interchangeability of the copy board by a translucent screen frame for the unit, when it is used as a viewer.

Another object is to provide positive displacement vacuum pumps and connections through swivel-bearings at the sides of the copy board to the under side of the perforated board face for holding copy material on said face by suction.

Another object is to use a double-faced board of the above type with a partition wall fixed in the middle of the space between opposed board faces to provide separate chambers, one in communication with the swivel-bearing on one side of the copy board and the other with that on the other side thereof, through slide valves on the corresponding sides of the board frame, said slide valves being manually adjustable to connect or disconnect the corresponding chamber with the vacuum source, except that operation of the valve on the side connected with the lower of the two chambers is prevented while the board is locked in that position, so as to prevent accidental dropping of the copy which may be mounted on that face, until the board is turned over for removal of the copy when the vacuum is temporarily cut off by means of the proper slide valve.

A further object is to provide means for swinging the camera, when adjusted to its highest position, forwardly to a panel opening in the enclosure of the device, to bring it within a comfortable distance for the operator to install or remove a film therein or change lenses, etc.

Figure 9:
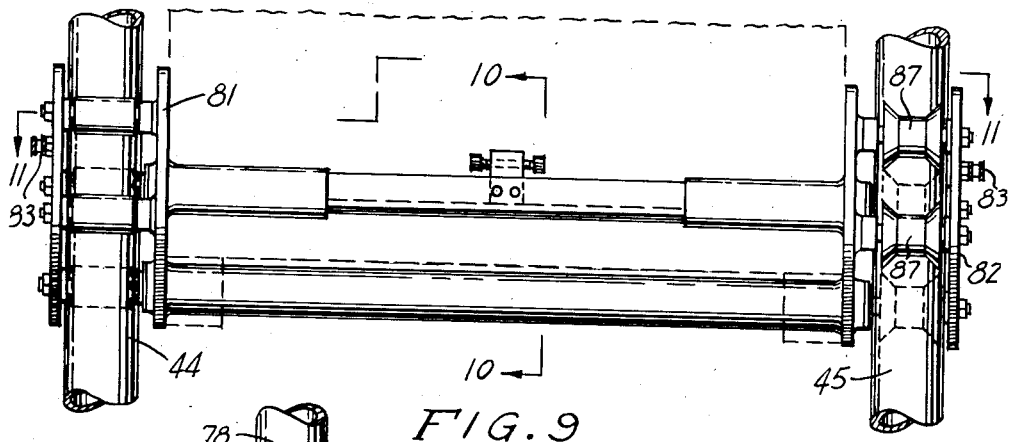
Figure 8:
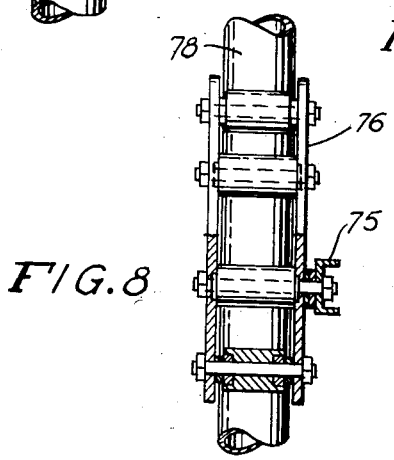
Figure 10:
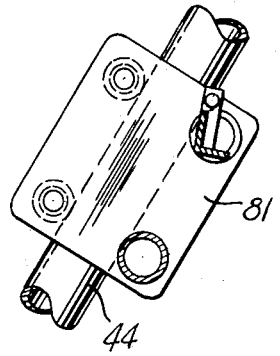
Figure 11:
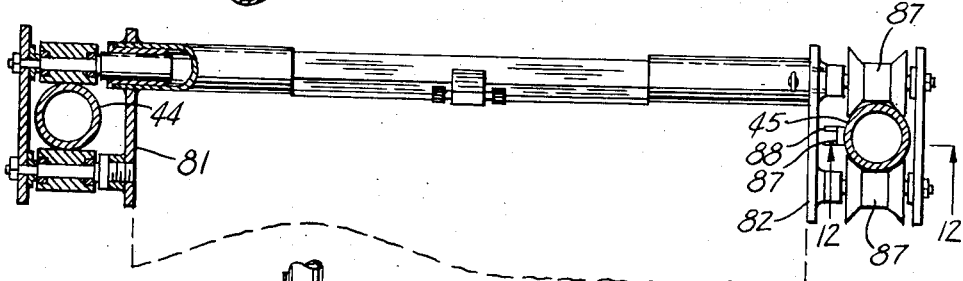
Figure 12:
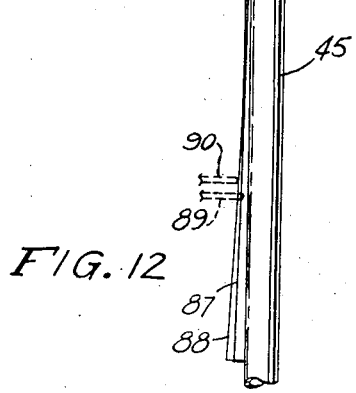
Figure 16:
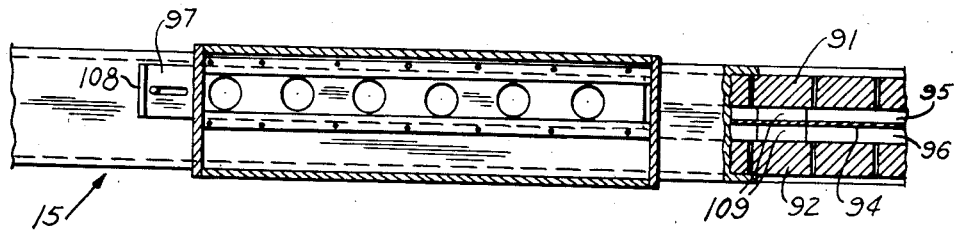
Figure 17:
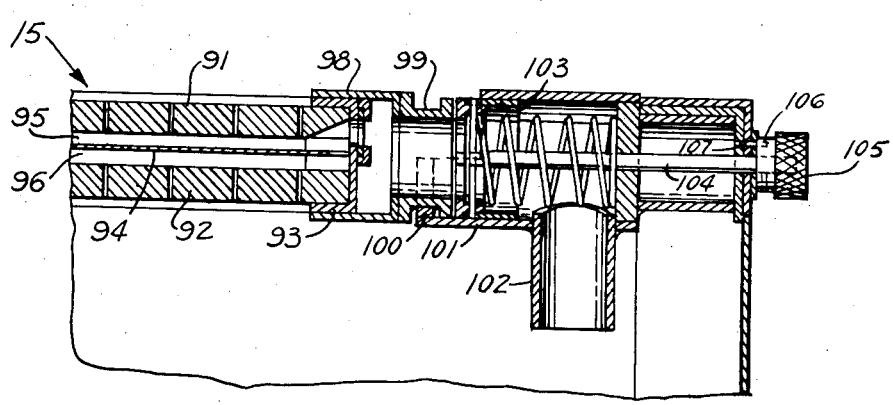
Figure 21:
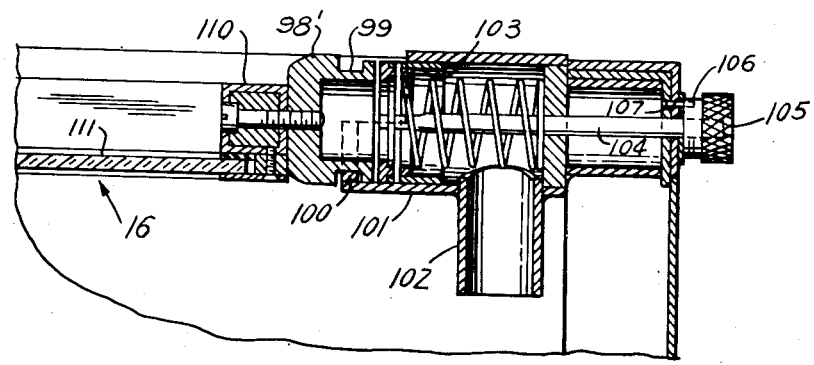

Other and more specific objects will become apparent in the following detailed description of one form of construction built to carry out the objects of this invention, as illustrated in the accompanying drawings, wherein:

Figs. 1 and 2 are front and end elevational views, respectively, of the copy camera-enlarger-viewer unit, Fig. 3 is a section in elevation taken on the line 3—3 in Fig. 4, Fig. 4 is a vertical section taken on the line 4—4 of Fig. 3, Fig. 5 is a somewhat enlarged horizontal section taken on the line 5—5 of Fig. 3, Fig. 6 is a still further enlarged detail sectional view taken on the line 6—6 of Fig. 5, Fig. 7 is a detail sectional view taken on the line 7—7 of Fig. 6, Fig. 8 is a similar detail sectional view showing the use of plane rollers instead of grooved rollers for use in one of the guide roller cages for the mirror frame, Fig. 9 is an enlarged view in elevation of the adjustable camera support guided on tubular guide rails, Fig. 10 is a sectional detail view taken on the line 10—10 of Fig. 9, Fig. 11 is a sectional detail view taken on the line 11—11 of Fig. 9, Fig. 12 is taken on line 12—12 of Fig. 11, to show the auto focus cams on one of the tubular guide rails for the camera, Fig. 13 is a normal plan view of the portion of the top of the device in which the copy board is mounted, Fig. 14 is an enlarged sectional detail view of the copy board locking device, taken on the line 14—14 in Fig. 13, Fig. 15 is a detail view taken on the line 15—15 of Fig. 13, Figs. 16 and 17 are detail sectional views taken on the lines 16—16 and 17—17 respectively, Fig. 18 is similar to Fig. 13 but shows the copy board replaced by a screen board for use as a projection screen when the device is used as a viewer, Fig. 19 is similar to Fig. 14 and shows how the screen board is locked in place by the same locking means applied to the copy board, and Figs. 20 and 21 are detail sectional views taken on the lines 20—20 and 21—21 respectively, of Fig. 18.

The present device is called the Integrated Micrographic Camera because it was designed to form a part of the Integrated Micrographic System for rapidly converting bulk graphic material to strip film form, which may be either 35 mm. or 70 mm., black and white or color, direct, negative or reversal, perforated or unperforated. Two other parts of this System are a processor versatile enough to automatically process the wide range of films exposed in the camera, and an Ozalid Printer to give the great variety of duplicating possibilities associated with the diazo process, which requires no water for operation.

Thus the above strip film may in turn be converted to duplicate film strips in the printer or to enlarged paper prints to the scale of the original graphic material, or a different scale, or to enlarged transparencies in the present device for further contact printing at the required scale. Nominal reduction ratio range is 1:10 to 1:30 for 35 mm. film and 1:5 to 1:15 with 70 mm. film.

The present device is a multi-purpose device employing either 35 mm. or 70 mm. unperforated film. It functions as a copy camera, enlarger, or viewer with either size of film.

It is entirely self contained, encompassing in the single unit, copy board, copy lights, and combination copy/enlarging camera. The folded optical path avoids the conventional tall column, usually associated with large-scale reduction or enlarging.

The optical path is folded by means of a mirror 10 which moves in synchronism with the camera 11. Reflective side panels 12 are used to fold the copy illumination path. They place the main copy lights 13 effectively outside the frame at at floor level. Small auxiliary lamps may be additionally placed to improve uniformity of copying illumination. An integral condenser type lighting system 14 is used for enlarging and viewing.

The vacuum copy-board 15 is interchangeable with a special ground glass viewing screen 16 and a special set of high aperture lenses is provided to permit viewing and measurement of projected material in a lighted room. The various lenses 17 automatically mate with the proper autofocus cams 18 which are a part of the power driven Scale Control. Reduction or enlarging scale is continuously variable at the will of the operator and is indicated on an illuminated tape visible through a window 19 on the operating panel 20.

Film supply is contained in special magazines 21 and is fed through the camera automatically when copying. Film transport in either direction is manually controlled when enlarging or viewing. An electrically operated counter 22 indicates the number of frames advanced.

An electronic timer 23 provides semi-automatic exposure control and compensates for scale changes.

Selection of the proper electrical circuit for the desired function is controlled by a single function switch 23' which simultaneously disables any conflicting or unwanted circuits. Circuit breakers, fuses and safety interlocks are provided to protect the mechanism and reduce operator error to a minimum.

The Integrated Micrographic Camera is designed specifically for reduction copying of large scale graphic material, either line or tone, to 35 mm. or 70 mm. film. Color or black and white film may be used. Secondary functions are photo-enlarging and rear-projection viewing, of either the copy negatives, or of other negative or positive material of the same formate.

The copying operation is semi-automatic and copy handling time is halved by the double-sided vacuum copy board 15. Fresh copy is placed on the upper side of the board while the camera photographs the material on the under-side. A completely independent vacuum supply is provided for each side of the board.

Exposure timing is automatic after proper setting, and upon completion of each exposure, the shutter closes and film is automatically advanced one frame. The camera is then ready for the next piece of copy and another exposure.

The enlarging function is just the reverse of that of copying. The negative strip is placed in the camera and sensitized paper or film on the vacuum board.

Setting the function switch 23' to "Enlarge" opens the camera shutter, connects the enlarging lamp to the electronic timer and energizes the manual film transport system. The timer makes an exposure for the selected time by turning the enlarging lamp "on" and "off."

Following each exposure, film must be advanced by pushing the film transport button 24. Direction of transport will be determined by setting of the "Adv.-Film-Rev" switch 25.

For viewing, the vacuum board 15 is replaced by the ground glass screen 16. The function switch 23' is set to "View" and the film threaded into camera.

The proper viewing lens must be installed in the proper lens head, in place of the copying lens, to provide additional illumination if the copy is very dense, or if room lights must be on.

Film may be transported in either direction, at will, by use of the transport button 24 and selector switch 25. Frames will be counted exactly as in the other applications.

The timer circuit is disabled and the enlarging lamp remains "on."

Scale may be set the same as when enlarging or viewing by means of the reverse control switch 26.

The operating panel 20 is further provided with exposure sensitivity and range controls 27 and 28 and exposure control button 29. The control panel 30 is further provided with copy lights switch 31, elevator control switch 32 and fuses 33 for the several operating circuits. The power panel 34 has the main switch 35 and the vacuum pump switches 36.

The main switch 35 supplies current to all the operating circuits and its own neon pilot 37 directly above it.

The pump switches 36 control right and left side vacuum pumps, preferably of the positive displacement type. Each switch has its own pilot light, 38 or 39, to indicate when the corresponding switch is on to supply vacuum to that side of the board.

The function switch 23' has four positions. The "Off" position disables all circuits and indicators except 35 and 39. The "Copy," "Enlarge" and "View" positions each energize the "Elevator" circuit and the "Scale" illuminator light.

The "Copy" position further energizes the "Copy Lights" switch 31, timer and camera circuits and arranges the camera for automatic film transport following each exposure, and closes the shutter.

The "Enlarge" position also opens the camera shutter, connects enlarging lamp to timer and enables the "Adv.-Film-Rev." switch 25 and "Transport" switch 24 for selective manual film advance.

The "View" position also disables the entire timer circuit, turns enlarging lamp on and maintains other functions of the "Enlarge" position.

The scale switch 26 controls the reduction or enlarging scale ratio as indicated on the illuminated scale tape in the window 19. This switch is pushed up for reducing the scale and down for increasing it, and automatically returns to neutral position when released. Limit switches are provided to stop the mechanism at either end of travel. An associated interlock switch disables the elevator switch 32 when the scale is less than maximum, thus permitting moving the camera into servicing position only when it is at its uppermost elevation on the guide rails 44 and 45.

The elevator switch 32 when pushed up, raises the camera to the loading or servicing position, provided the scale adjusting mechanism is at maximum scale, and the service panel door is down. Associated limit switches automatically stop the elevator at the top of its travel and reverse the motor ready for lowering. When switch 32 is pushed down the camera is returned to taking position, provided the camera door 41 is properly closed and locked. Another limit switch stops the mechanism and reverses the motor ready for the next elevation.

The "Copy Lights" switch 31 controls the copying lights 13 when the functon switch 23' is set to "Copy" position. Switch 31 is automatically disabled in any other position of switch 23'.

The "Exposure" button 29 trips the electronic timer to make exposure in either "Copy" or "Enlarge" positions of switch 23'. This button is disabled when viewing.

The film transport switch 24, disabled when copying, advances the film in both "Enlarge" and "View" operations. A single short push advances a single frame of the film. It can be held down for rapid advance of as many frames as desired.

The "Adv-Film-Rev" switch 25 is disabled when copying. Otherwise it selects the direction of film travel when enlarging or viewing.

The timer sensitivity control 27 sets the sensitivity of the timer circuit and is normally set between 20 and 60. It is used for fine adjustments of the time range. The timer range control multiplies the timer sensitivity setting by a factor of 2 for each step.

A shutter indicator light 46 goes out when the shutter opens either for exposure or when held open by the function switch.

A timer counting indicator light 47 goes out whenever the timer is tripped and is measuring an exposure and when viewing. It may be used to check the actual exposure time.

A camera warning indicator light 40 glows whenever there is no film in the camera, or the threading lever is not properly released, or the camera door 41 is not properly closed and locked.

The frame counter 22 counts each frame of film of either size, but does not subtract when the film is moving in reverse, i. e. from right to left.

The mirror may be provided with levelling screws under the edges of the mirror frame. Frame levelling screws may also be provided at the corners of the main frame 48.

The scale control switch controls the motor 49 in either direction, to change the scale reduction or enlargement, as the case may be, through a reduction gear box 50, chain and sprocket connection 51, shaft 52, the helical gear connection 53 and shaft 54 with the two chain drive sprockets 55 at its ends for elevating the mirror 10, while the bevel gear connection 56 connects shaft 52 to the vertically extending articulated shaft with an extensible portion 57 having universal joints 58 and 59 at its ends to permit operation of the camera elevator mechanism, to be hereinafter further described, the upper end of the articulated shaft having a bevel gear connection to shaft 59' which has chain drive sprockets at its ends to drive chains 60 and 61 for simultaneously and correspondingly adjusting the camera along the rails 44 and 45.

The horizontal mirror is just large enough and so positioned, that at maximum scale it will fully accommodate the entire beam carrying the image between the full board frame and the film frame, the board frame being held at an angle normal to the leg of the beam reflected by the mirror from the projector, or to camera, as the case may be.

Thus the projector or camera axis is held at an angle back of the vertical axis passed through the center of the mirror, equal to the angle forward of this vertical axis, at which the beam extends between the mirror and the board. This angle is substantially 20° in the present device. For a wide range of scale adjustment, with the board held stationary, and the mirror being raised vertically, and the projector or camera being simultaneously lowered toward the mirror to shorten the path of the beam and thus reduce the scale, it was found that best results and greatest scale reduction could be obtained without moving any part of the beam off the mirror or board, by linearly adjusting the camera or projector along an angle to the vertical axis greater than the above angle of the projector or camera axis. In the present device this angle of adjustment is about 40° from the vertical.

The elevator switch 32 controls the motor 62 for moving the camera to servicing position by operating the jack 63 through an articulated shaft 64. The jack shaft 65 is pivoted to a support frame in which the guide rails 44 and 45 are mounted. This support frame has side brackets 66 by means of which it is pivotally suspended by links 67 from the main frame uprights 68. Angle bars 69 forming the sides of this support frame normally rest against the uprights 68 when the jack shaft 65 is fully withdrawn. But when it is extended a sliding leverage is set up causing the links 67 to swing forward, carrying the upper portion of the support frame with the camera forward and upward toward the panel door 42, while the upper panel door 43 is slightly raised by rollers 70 mounted on arms 71 extending from the camera mounting frame. The lower ends of bars 69 are provided with rollers 72 for guiding the resulting movement of the lower portion of the support frame along the uprights 68. Diagonal braces 73 and 74 form a part of the support frame for rigidly fixing the lower ends of guide rails 44 and 45 in the support frame.

The mirror frame 74 may be formed of angle bars and extends to roller guide cages 76 and 77 guided over vertical guide posts 78 and 79 respectively. These cages are attached as at 80 to the chains operated by sprockets 55, whereby the mirror is adjusted vertically as already pointed out.

The roller guide cages 81 and 82 for the camera support are attached as at 83 to the sprocket chains 60 and 61 for simultaneous movement of the camera support along the guide rails 44 and 45 as already noted. Grooved guide rollers such as 87' may be used in only one of each pair of guide cages to provide lateral stability to the respective supporting frames.

The copy lights mainly comprise two banks of fluorescent lights mounted in louvered enclosures 84 and 85 the louvres being formed by shielding baffles 86 for directing the light from the bottom angularly outwardly and forwardly along the sides of the device for indirect lighting of the under face of the board. The reflector linings or panels 12 help to diffuse the light.

The guide rail 45 is provided with cam ridges 87 and 88 for cooperation with lens focusing followers 89 and 90 for the 35 mm. and 70 mm. lens assemblies, whereby the focus is automatically adjusted as the scale is changed to maintain the image focused with respect to the film or the board face, as the case may be, depending on whether the camera is used for making an exposure on the film or as a projector of the film on the board face for viewing or enlarging.

As already mentioned the copy board 15 is of the perforated type supplied internally by a source of suction or vacuum for holding copy material on its perforated face while the board is turned over for the reproduction thereon or therefrom. Board 15 is composed of two spaced, perforated faces or plates 91 and 92, mounted in a frame 93 with a partition 94 extending the full area of the plates substantially midway of the spacing between them to form separated vacuum chambers 95 and 96 back of their respective plates. Aligned spacers 109 in the two chambers may be arranged at intervals. One of these chambers is connected through a manually operated side valve 97 to the hollow pivot bearing 98 at one side of the frame 93, while the other is similarly connected to the hollow pivot bearing at the other side of the frame 93. These pivot bearings have grooves 99 to interlock with ridges 100 in mating half bearings 101 extending inwardly from the sides of the board space in the top of the device wherein the board fits when its pivot bearings 98 are laid in the half-bearings, and sealed to the elbow connections 102 leading to the source of vacuum. This seal at each bearing is provided by a spring-biased sleeve 103 extending from the horizontal portion of the elbow against the end of the pivot bearing 98. A rod 104 connected to sleeve 103 extends outwardly to a knob 105 on the side of the main frame 48 of the device, for pulling the sleeve outwardly and holding it there, out of the way of the pivot bearing when installing the board. The knob 105 is provided with a pin 106 mounted in its underside and fitting into a matched opening 107 in the side of frame 48. When the knob 105 is pulled and pin 106 withdrawn from its opening, the knob may be turned to move the pin out of register with its opening, and the sleeve 103 will then be locked in withdrawn position until the board is mounted in place, when the knob may be turned back to match the pin with its opening and released to permit the sleeve 103 to move against the end of the pivot bearing to form a rotatable seal.

The screen board 16 is provided with similar pivot bearings for mounting in the half bearings in the same manner, even though the sealing means is of no effect in this case, as a sealing device but merely takes up any end play.

The slide valve 97 in each side of the copy board 15 has an ear 108 at its outer end for finger operation to open or closed position. The clearance in the top of the device around the board opposite the ear 108, when the corresponding vacuum chamber is in the lower half of the board, is such that the valve cannot be operated to close the valve accidentally and permit the copy that may be on the bottom face to fall off. The board has to be turned over before the valve can be shifted to closed position for removal of the copy on that face, because sufficient clearance is then provided opposite the ear 108 to reach it with a finger to close the valve. When a new copy is then mounted the valve is again opened and the copy will be held firmly by suction while the board is turned over for copying.

By using this double-faced copy board, the output is doubled, because while one copy is being reproduced, another is being replaced on the top face.

The screen board 16 is composed of a frame 110 provided with pivot bearings 98', and a translucent plate 111 mounted in the frame.

A spring-pressed tapered pin 112 is mounted in the front edge member 113 of the main frame 48 meshing with a conical depression 114 in the front and rear edges of the frames of boards 15 and 16 for locking either board in the desired operating position.

The operation of the device is as follows:

Assuming that the camera is to be used for copying onto 35 mm. film, and that the power line, the vacuum pump cables and hoses are connected, and that the vacuum copy board 15 is in place:

Depress main breaker handle 35 to energize the electrical system. Set function switch 23' to "Copy" to allow timer to warm up, and turn copy lights on, so they too can stabilize.

Lower the upper service door 42 by first slightly lifting the top panel 43. This will expose the mechanism for observation.

Use the scale switch 26 to bring the camera to maximum reduction—in this case 27—and energize the elevator circuit. Throw elevator switch 32 to "up" and observe the loading elevator as it jacks the camera up and forward from the position shown in Fig. 3 to the loading position in the opening of the service door 42. The mechanism stops automatically at proper point.

Open the camera door 41 and then thread the film through the camera and mount the proper lens in place.

Press the exposure button 29 and observe camera action. The shutter and timer counting indicators will go out, then on, and the camera will transport one frame of film. Repeat this operation until satisfied threading is correct. Close and lock camera door and set elevator switch to "Down."

While the elevator is operating, set frame counter to zero and timer controls to "0" and 1. Press exposure button 8 times to run off the film exposed in loading. (If film is supplied with a blank leader, run off 24 frames or 3 feet to reach actual film.)

Re-zero frame counter and camera is ready for use.

Start both vacuum pumps and open the vacuum valve which is uppermost. Now place copy on board, centered in the outlined area nearest to copy size. Release copy board latch at front center of frame and flip the board over to place copy in camera field.

Set the reduction scale to match size of copy—or the reduction desired. Set timer controls for indicated exposure and make an exposure by momentarily depressing the exposure button 29.

The camera will automatically go through a complete exposure-transport cycle and reset itself for next shot. Frame counter will register 0001.

While first exposure is underway, attach next piece of copy to top of copy board as above. When first exposure is complete, flip the board over and repeat the operation above. Counter will indicate each exposure up to 800 for a full 100 ft. roll of 35 mm. film, or 400 for 70 mm. film.

For enlarging from 35 mm. or 70 mm. film:

Make initial set-up as in copying, using the lens and aperture plate matching size of film to be enlarged.

After threading camera, set function switch to "View" and use the beam from the lamp to register first frame of film in the aperture.

Close film path by releasing threading lever.

Check film advance by depressing film transport button several times. Set "Film-Adv-Rev" switch to "Rev" and return to first frame by again depressing transport button the proper number of times. Return selector switch to "Adv."

Set function switch to "Enlarge" and check exposure by depressing exposure button. Notice that film is not automatically advanced.

Close and lock camera door and set elevator switch "Down." Start vacuum pumps and set timer controls. Set enlarging scale. Zero frame counter.

Place sensitized material on board, swing board over and make first exposure. Place next piece of sensitized material on upper side of board ready for second exposure. Transport film only after making the desired number of prints of each frame.

Note that frame counter does not indicate number of prints, but only the frames advance.

For viewing either 35 mm. or 70 mm. film:

Pull out and lock the vacuum board release knobs at each end of frame. Tilt the copy board to vertical and carefully lift it out of its bearings.

Carefully place the ground glass panel into the bearings with the latch plate at bottom and smooth side of glass facing front. Swing the panel into focal plane and latch it. Now release the knobs at each end to center the screen.

Select the proper lens head and replace the copying lens with the matching projection lens. Install lens head on camera.

Set function switch to "View" and thread and register film as before. As soon as camera reaches operating position, the image will appear on the ground glass screen. Scale is set exactly as before.

Notice that lamp remains on, timer is off, and film may be transported a frame at a time or continuously in either direction.

While illustrative specific forms of construction and arrangement of parts are shown, many obvious modifications may be made therein without departing from the spirit and scope of the present invention, as defined in the appended claims.

What is claimed is:

1. A camera-projector-enlarger comprising an enclosed frame structure including a plane mirror adjustable normally to its reflecting surface, a stationary copy board opposed to but at a small angle to the plane of said mirror, a camera pointed toward said mirror at an angle so that a beam of light travelling along its optical axis from the mirror will carry a reflection of the principal point on said copy board along a beam substantially normal to said copy board, and means for simultaneously adjusting said mirror normally to its reflecting surface and said camera along an angle to this normal greater than that of the camera axis.

2. A folded-beam camera-projector-enlarger comprising a mirror, a camera lens assembly, a stationary board surface, said camera lens assembly and board surface having their optical and normal axes respectively equi-angularly inclined on opposite sides to the normal axis of said mirror to provide reflection of a projection beam along said axes between said camera lens assembly and said board, and means for adjusting said mirror along its normal axis and said camera lens assembly along a linear path in the plane of said axes but at greater angle to said normal axis than the optical axis of said camera lens assembly, whereby a compact unit is provided with a maximum range of reduction and enlargement.

3. A folded-beam camera-projector-enlarger as defined in claim 2, wherein said adjusting means includes interconnecting drive means for simultaneous proportional adjustments of the lens assembly and the mirror to maintain said projection beam within the edges of said mirror and said board surface, whereby construction of a compact unit having a maximum range of reduction and enlargement is facilitated.

4. A combination as defined in claim 3, and an opaque enclosure for said combination to facilitate its use as a projector or enlarger, said enclosure including an inclined table top portion.

5. A combination as defined in claim 4, the mirror being horizontally supported, and being vertically adjustable substantially from the bottom center of said enclosure, and a board providing said board surface mounted in an opening in said inclined table top portion of said enclosure.

6. A combination as defined in claim 5, said enclosure having a raised cabinet portion at the rear of said table top portion, said camera lens assembly being adjustable into the space enclosed by this cabinet portion.

7. A combination as defined in claim 6, said raised cabinet front panel forming a door in its center portion, hinged at the bottom and opening over the table top portion, the side portions of said front panel serving as power and control panels, the table top portion to the right of said board serving as an operating panel, the top of the cabinet portion being a door hinged along the back and having means at its front edge overhanging the top of the front panel door to normally hold it in closed position, whereby the top has to be raised to permit opening of said front panel door.

8. A combination as defined in claim 7, and elevator means for said camera lens assembly when in its uppermost position to swing the assembly to said front panel door opening for servicing, said assembly having a door on its front wall providing access to its film threading mechanism, and detachable film supply and take-up magazines on the sides of said assembly.

9. A combination as defined in claim 8, said film threading mechanism and magazines being adapted to handle a plurality of sizes of film without perforations, and means for selectively mounting a corresponding plurality of frames and pressure plates suitably spaced in said camera lens assembly back of its lens for selectively accommodating corresponding sizes of film.

10. A combination as defined in claim 9, said camera lens assembly having a condensing lens lighting system on its top in axial alignment with its optical axis for use in projection or enlarging of film frames in said camera lens assembly on said board surface, and a translucent screen board adaptable for use in said table top opening for viewing projections thereon.

11. A combination as defined in claim 10, and a double faced board for holding either copy material for reduction on film in the camera lens assembly, or sensitized material for enlargements from film frames in said camera lens assembly by projection on said sensitized material, said board being provided with pivot bearings extending axially from its side edges and adapted to rest in half bearings extending inwardly from the sides of the opening in the table top portion for the board, the front edge of said opening being provided with a spring pressed pin adapted for locking into mating depressions selectively in the opposite axial edges of said board, whereby the board may be flipped over and locked in position for turning either of its faces down toward the mirror after mounting the desired material on said face, thus permitting replacement of material on the top face while exposing or copying that on the lower face.

12. A double faced board as defined in claim 11, each face being perforated and provided with a chamber back of each face, and a source of vacuum connected through said bearings to the back chambers of said faces for holding said material thereon.

13. A board as defined in claim 12, said pivoted bearings being hollow, and each connected to one of said back chambers through ports in the adjacent edge walls of the corresponding chambers, said half bearings having conduit means for connecting the source of vacuum in rotary sealing relation to the ends of said hollow pivot bearings, and slide valves for said ports extending along the corresponding board edges from the sides of said pivot bearings, having ears for finger operation to shut the valve to the back chamber of the upper face while replacing the material thereon, by finger operation through a clearance provided in the table top opening opposite said valve operating ear, no such clearance being provided opposite said ear when the board is turned over to prevent accidental shutting off of the wrong valve and dropping the material inside the enclosure.

14. A combination as defined in claim 10, and a function control switch for disabling all circuits not required for the operation of a particular function, said switch having "Off," "Copy," "Enlarge" and "View" positions, whereby accidental operation of undesired circuits is avoided.

15. A combination as defined in claim 14, a reversible motor and control switch for driving said mirror and camera adjusting means to vary the scale of reduction or enlargement, indicating means on said operating panel showing the scale ratio at any adjustment.

16. A combination as defined in claim 14, an electronic timer, and an exposure button on said operating panel for making an exposure in either "Copy" or "Enlarge" functions, said button being disabled in the "View" function.

17. A combination as defined in claim 16, a timer sensitivity control means mounted in front of said camera lens assembly and a timer range control for setting and multiplying the sensitivity of said timer circuit.

18. A combination as defined in claim 14, a film transport control on said operating panel, disabled when copying, for advancing the film in both the "Enlarge" and "View" operations, and a selector switch for determining the direction of film travel.

19. A combination as defined in claim 14, said camera lens assembly having a warning glow indicator on its front, and means for causing said glow whenever the film runs out or the threading mechanism is not properly seated or the camera door is not properly closed.

20. A combination as defined in claim 3, and means for simultaneously adjusting the lens assembly to focus it in accordance with the scale adjustments.

References Cited in the file of this patent

UNITED STATES PATENTS

| | | |
|---|---|---|
| 2,133,978 | Draeger | Oct. 25, 1938 |
| 2,141,176 | Draeger | Dec. 27, 1938 |
| 2,303,518 | White | Dec. 1, 1942 |
| 2,412,551 | Pratt | Dec. 10, 1946 |
| 2,437,898 | Swanson | Mar. 16, 1948 |
| 2,564,440 | Maser | Aug. 14, 1951 |
| 2,596,811 | Carlson | May 13, 1952 |

FOREIGN PATENTS

| | | |
|---|---|---|
| 942,078 | France | Sept. 13, 1948 |